United States Patent Office 3,004,000
Patented Oct. 10, 1961

3,004,000
POLYVINYL CHLORIDE RESIN COMPOSITIONS STABILIZED FOR USE IN FOOD PACKAGING
Otto S. Kauder, Jamaica, and Norman L. Perry, Seaford, N.Y., assignors to Argus Chemical Corporation, a corporation of New York
No Drawing. Filed Mar. 15, 1960, Ser. No. 15,060
20 Claims. (Cl. 260—45.75)

This invention relates to polyvinyl chloride resin compositions having remarkable heat stability, and which are safe to use in food packaging, stabilized by a combination of calcium or zinc benzoate, calcium or zinc salts of the mixed fatty acids derived from edible fats and oils and sorbitol.

In recent years a number of patents have issued showing how to stabilize polyvinyl chloride resins using organotin compounds. Among these patents are Nos. 2,883,363, issued April 21, 1959; 2,872,468, issued February 3, 1959; 2,870,182 and 2,870,119, issued January 20, 1959; all to Leistner and Hecker, No. 2,914,506, issued November 24, 1959, to Mack and Parker, and 2,801,258, issued July 30, 1957, to Johnson. Organotin compounds because of their unusual heat stabilizing properties have now set a standard for heat stability which remains unequaled. However, the organotin compounds have the disadvantage that they are toxic, and this limits their use to applications where toxicity is not a problem. Moreover, most of these compounds are liquids, and therefore of limited utility with rigid vinyl polymers.

In accordance with the instant invention, polyvinyl chloride resins which are safe for use in food packaging and which have remarkable heat stability at elevated temperatures are obtained using as the stabilizer system a calcium-zinc salt combination composed of a member of the group consisting of calcium and zinc benzoates, a member of the group consisting of calcium and zinc salts of the mixed fatty acids derived from edible fats and oils, and sorbitol. Mixtures of the calcium and zinc benzoates and calcium and zinc salts can be used. The stability to long term heating imparted by this combination is extremely good, equaling or bettering that furnished, for example, by alkyl tin mercaptides. Because the stabilizer combination is a solid, this stabilization is obtainable without deterioration of any of the other properties of the resin. The compositions of the invention are stable at the extraordinarily high temperatures which are required in the case of rigid polymers, as compared to plasticized polyvinyl chloride resins, i.e., at temperatures of 375° F. and higher. They also are safe to use in food packaging, which makes it possible to use the rigid nonplasticized polyvinyl chloride resin compositions of the invention in the fabrication of food containers.

The stabilizer system of the invention is far more effective than any of the ingredients thereof taken alone or in pairs showing that the combination of all three components, i.e., the calcium and zinc benzoate and salts of the mixed fatty acids derived from edible fats and oils, and sorbitol, gives a synergistic effect. Combinations, for example, of calcium benzoate and sorbitol, of zinc salts and sorbitol, and of calcium benzoate and zinc salts, are not sufficiently effective at the elevated processing temperatures, i.e., 375° F. and higher, required in the processing of rigid polymers to be useful stabilizers. Combinations of zinc stearate or calcium stearate and sorbitol are disclosed in Patent No. 2,711,401 to Robert E. Lally, patented June 21, 1955.

The proportions of the three components of the stabilizer system of the invention are quite critical in obtaining effective stabilization under the required conditions. Good stabilization is obtained at proportions within the range from about 15 to about 40 parts of the benzoate, from about 15 to about 50 parts of the fatty acid salts, and from about 20 to about 60 parts of sorbitol. Preferably, the stabilizer system contains 3 parts of the benzoate, 3 parts of the fatty acid salts, and 3 parts of sorbitol. It will be understood that the term "fatty acid salts" refers to the calcium and zinc salts of the mixed fatty acids derived from edible fats and oils. Exemplary are the mixed fatty acids derived from tallow, coconut oil, cottonseed oil, soybean oil, corn oil and peanut oil. The oils from which the fatty acids are derived may be hydrogenated, if desired. Also useful are the distilled fractionated fatty acid mixtures derived from such oils.

The amount of the stabilizer system should be sufficient to permit heating of the stabilized polyvinyl chloride resin composition at 375° F. for at least one hour without the development of heat decomposition. Usually, from 3 to 6% stabilizer system by weight of the resin will be sufficient to meet most needs in use. Good resistance to heat deterioration is obtainable employing only small amounts of the stabilizer system, as little as 1% by weight of the resin. The more stabilizer employed, the better the resistance to heat deterioration, up to amounts of 6% by weight of the resin. Beyond this, the stabilization effect may not be greatly enhanced, and such larger amounts may accordingly be wasteful. However, amounts up to 10% can be employed if desired.

The invention is applicable to any polyvinyl chloride resin. The term "polyvinyl chloride" as used herein is inclusive not only of polyvinyl chloride homopolymers but also of copolymers of vinyl chloride in a major proportion and other copolymerizable monomers in a minor proportion, such as copolymers of vinyl chloride and vinyl acetate, copolymers of vinyl chloride with maleic or fumaric acid, and copolymers of vinyl chloride with styrene. The invention also is applicable to mixtures of polyvinyl chloride in a major proportion with a minor proportion of other synthetic resins such as chlorinated polyethylene or a copolymer of acrylonitrile, butadiene and styrene.

The invention is of particular application to the stabilization of rigid polyvinyl chloride resin compositions, that is, resin compositions which are formulated to withstand high temperatures, of the order of 375° F. and higher. Plasticization of such polymers is permissible provided this does not reduce the softening point of the resin to below the temperature to which it must be subjected. However, the stabilizer systems of the invention can be used with platicized polyvinyl chloride resin compositions of conventional formulation where high softening point is not a requisite. Conventional plasticizers well known to those skilled in the art can be employed such as, for example, dioctyl phthalate and octyl diphenyl phosphate.

The preparation of the stabilized resin composition is easily accomplished by conventional procedures. The selected stabilizer system ordinarily is blended with the polyvinyl chloride resin using, for instance, plastic mixing rollers at a temperature at which the mix is fluid and thorough blending facilitated, milling the stabilizer system with the resin on a two roll mill at from 300 to 400° F. for a time sufficient to form a homogeneous sheet. The plasticizer, if one is employed, is incorporated with the stabilizer. Usually, five minutes milling time is adequate. After the mass is uniform, it is sheeted in the usual way.

The following examples in the opinion of the inventors constitute the preferred embodiments of their invention:

EXAMPLE 1

Plastic composition: Parts by weight
- Geon 103 Ep (homopolymer of polyvinyl chloride) — 150
- Stabilizer system as noted in Table I — 9

The stabilizers were blended with the polyvinyl chloride on a two roll mill up to 375° F. and then held in an oven at 375° F. to determine their heat stability. The discoloration was noted and is reported in Table I below.

*Table I*

|  |  | Parts per 150 parts of resin | Heat discoloration for minutes of heating |  |  |  |  |  |  |  |  |
|---|---|---|---|---|---|---|---|---|---|---|---|
|  |  |  | Initial | 15 | 30 | 45 | 60 | 75 | 90 | 105 | 120 |
|  | Control—no stabilizer | | White | Dark brown | Black | Black | Black | Black | Black | Black | Black. |
| I | Calcium benzoate | 9 | Medium brown | do | do | do | do | do | do | do | Do. |
| II | Zinc salts of tallow fatty acids | 9 | White | Black | Black | do | do | do | do | do | Do. |
| III | Sorbitol | 9 | do | Dark grey | do | do | do | do | do | do | Do. |
| IV | {Calcium benzoate / Zinc salts of tallow fatty acids} | 4.5 / 4.5 | do | Black | do | do | do | do | do | do | Do. |
| V | {Calcium benzoate / Sorbitol} | 4.5 / 4.5 | do | Red | Dark red | Dark reddish brown | do | do | do | do | Do. |
| VI | {Zinc salts of tallow fatty acids / Sorbitol} | 4.5 / 4.5 | Cream | Bright yellow | Bright yellow | Yellow-black edges | do | do | do | do | Do. |
| VII | {Calcium benzoate / Zinc salts of tallow fatty acids / Sorbitol 1:1:1} | 3.0 / 3.0 / 3.0 | Pale yellow | Yellow | Yellow | Yellow | Yellow | Yellow | Yellow | Yellow | Light brown. |

It is apparent from the above results that the stabilizer system of the invention in the proportions indicated in VII gave by far the best results. The calcium benzoate, zinc salts of mixed tallow fatty acids and sorbitol alone, I, II and III, respectively, were completely ineffective, being no better than the control. The combinations of two of these, calcium benzoate and zinc salts of mixed tallow fatty acids, calcium benzoate and sorbitol, and the zinc salts of tallow fatty acids and sorbitol, Samples IV, V and VI, respectively, gave a slight improvement in heat resistance, but not enough to be acceptable. The difference between these and VII is very striking.

The stabilizer system of the invention retains clarity and good initial color in the stabilized resin formulation. The very high heat resistance at 375° F. is, of course, a measure of the heat resistance at ordinary atmospheric temperatures and shows that the compositions of the invention have a useful life under such conditions of at least three times that of the other compositions tested. This is a remarkable improvement.

Tests showed Sample VII to be nontoxic.

It is apparent from the above results that the stabilizer system of the invention gave a distinct improvement in preventing initial discoloration, and also discoloration after 120 minutes of heating. The other stabilizer combinations did not give nearly as good stability; in some cases the stabilization ended after about 30 minutes of heating, and in the remaining cases, heat decomposition set in after about 60 minutes of heating.

EXAMPLE 2

A series of compositions was made up as in Example 1 employing a copolymer of 96% vinyl chloride and 4% vinyl acetate. Similar results were obtained.

EXAMPLE 3

A stabilizer system was prepared composed of calcium benzoate 3.6 parts, zinc salts of mixed tallow fatty acids 3.6 parts, and sorbitol 1.8 parts. This stabilizer system was used in accordance with Example 1 in the amount of 9 parts by weight with 150 parts by weight of Geon 103 Ep resin. The composition was then held in an oven at 375° F. to determine its heat stability. The color noted was as reported in Table II below.

*Table II*

Initial—Light Yellow
After 15 minutes of heating—Yellow
After 30 minutes of heating—Yellow
After 45 minutes of heating—Yellow
After 60 minutes of heating—Yellow
After 75 minutes of heating—Yellow with dark edges
After 90 minutes of heating—Black In these proportions the stabilizer system does not impart quite as good heat resistance when used in the same amount as Sample VII of Table I. However, better stabilization could be obtained by using more of the stabilizer system by weight of the resin.

EXAMPLE 4

A stabilizer system was prepared composed of a mixture of the calcium benzoate 2.25 parts, zinc salts of mixed tallow fatty acids 2.25 parts, and sorbitol 4.5 parts. This stabilizer system was used in accordance with Example 1 in the amount of 9 parts by weight with 150 parts by weight of Geon 103 Ep resin. The composition was then held in an oven at 375° F. to determine its heat stability. The color noted was as reported in Table III below.

*Table III*

Initial—Pale Yellow
After 15 minutes of heating—Yellow
After 30 minutes of heating—Yellow
After 45 minutes of heating—Yellow
After 60 minutes of heating—Yellow
After 75 minutes of heating—Yellow
After 90 minutes of heating—Yellow
After 105 minutes of heating—Yellow
After 120 minutes of heating—Brown This stabilizer system is practically as good as Sample VII of Table I, giving stabilization up to 105 minutes at 375° F. instead of up to 120 minutes.

EXAMPLE 5

The series of formulations of Example 1 were prepared again, substituting zinc salts of the mixed fatty acids derived from coconut oil for the tallow fatty acids used in that example. The same results were obtained. The composition corresponding to Sample VII imparted adequate heat resistance for 120 minutes of heating at 375° F., whereas the other compositions tested gave stabilization only for about 45 minutes of heating.

EXAMPLE 6

The series of formulations of Example 1 were prepared again, substituting zinc salts of the mixed fatty acids derived from hydrogenated cottonseed oil for the tallow fatty acids used in that example. The same results were obtained. The composition corresponding to Sample VII imparted adequate heat resistance for 120 minutes of heating at 375° F., whereas the other compositions tested gave stabilization only for about 45 minutes of heating.

EXAMPLE 7

The series of formulations of Example 1 were prepared again, substituting zinc salts of the mixed fatty acids derived from hydrogenated corn oil for the tallow fatty acids used in that example. The same results were obtained. The composition corresponding to Sample VII imparted adequate heat resistance for 120 minutes of heating at 375° F., whereas the other compositions tested gave stabilization only for about 45 minutes of heating.

EXAMPLE 8

The series of formulations of Example 1 were prepared again, substituting zinc salts of the mixed fatty acids derived from peanut oil for the tallow fatty acids used in that example. The same results were obtained. The composition corresponding to Sample VII imparted adequate heat resistance for 120 minutes of heating at 375° F., whereas the other compositions tested gave stabilization only for about 45 minutes of heating.

EXAMPLE 9

A composition was prepared exactly as in Example 1 employing as the stabilizer system a mixture of 3 parts calcium benzoate, 3 parts of zinc salts of tallow fatty acids, and 3 parts pentaerythritol. This stabilizer system was used in the amount of 9 parts by weight with 150 parts by weight of Geon 103 Ep resin. The stabilization obtained when the resin composition was held in an oven at 375° F. was equivalent to that of Sample VII of Table I. Thus, pentaerythritol is an equivalent of sorbitol, but it would not be employed in the stabilizer systems of the invention at the present time, because pentaerythritol is not accepted as safe to use in food packaging.

EXAMPLE 10

Plastic composition:                                                Parts by weight
   Geon 103 Ep (homopolymer of polyvinyl
    chloride) _____ 150
   Stabilizer system as noted in Table IV _____ 9

The stabilizers were blended with the polyvinyl chloride on a two roll mill up to 375° F. and then held in an oven at 375° F. to determine their heat stability. The discoloration was noted and is reported in Table IV below.

being no better than the control. The combinations of two of these, zinc benzoate and calcium salts of mixed tallow fatty acids, zinc benzoate and sorbitol, and the calcium salts of tallow fatty acids and sorbitol, Samples XI, XII and XIII, respectively, gave a slight improvement in heat resistance, but not enough to be acceptable. The difference between these and XIV is very striking.

The stabilizer system of the invention retains clarity and good initial color in the stabilized resin formulation. The very high heat resistance at 375° F. is, of course, a measure of the heat resistance at ordinary atmospheric temperatures and shows that the compositions of the invention have a useful life under such conditions of at least three times that of the other compositions tested. This is a remarkable improvement.

Tests showed Sample XIV to be nontoxic.

It is apparent from the above results that the stabilizer system of the invention gave a distinct improvement in preventing initial discoloration, and also discoloration after 120 minutes of heating. The other stabilizer combinations did not give nearly as good stability; in some cases the stabilization ended after about 30 minutes of heating, and in the remaining cases, heat decomposition set in after about 60 minutes of heating.

EXAMPLE 11

A series of compositions was made up as in Example 10 employing a copolymer of 96% vinyl chloride and 4% vinyl acetate. Similar results were obtained.

EXAMPLE 12

A stabilizer system was prepared composed of zinc benzoate 1.5 parts, calcium salts of mixed tallow fatty acids 3 parts, and sorbitol 3 parts. This stabilizer system was used in accordance with Example 10 in the amount of 7.5 parts by weight with 150 parts by weight of Geon 103 Ep resin. The composition was then held in an oven at 375° F. to determine its heat stability. The color noted was as reported in Table V below.

*Table V*

Initial—Pale Yellow
After 15 minutes of heating—Yellow
After 30 minutes of heating—Yellow
After 45 minutes of heating—Yellow
After 60 minutes of heating—Yellow
After 75 minutes of heating—Yellow
After 90 minutes of heating—Yellow
After 105 minutes of heating—Black

*Table IV*

| | | Parts per 150 parts of resin | Heat discoloration for minutes of heating | | | | | | | |
|---|---|---|---|---|---|---|---|---|---|---|
| | | | Initial | 15 | 30 | 45 | 60 | 75 | 90 | 105 | 120 |
| | Control—no stabilizer | | White | Dark brown | Black | Black | Black | Black | Black | Black | Black. |
| VIII | Zinc benzoate | 9 | (1) | (1) | (1) | (1) | (1) | (1) | (1) | (1) | (1) |
| IX | Calcium salts of tallow fatty acids | 9 | Medium brown | Dark brown | Dark brown | Dark brown | Dark Brown | Black | Black | Black | Black. |
| X | Sorbitol | 9 | White | Dark grey | Black | Black | Black | ___do___ | ___do___ | ___do___ | Do. |
| XI | {Zinc benzoate / Calcium salts of tallow fatty acids} | 4.5 / 4.5 | ___do___ | Black | ___do___ | ___do___ | ___do___ | ___do___ | ___do___ | ___do___ | Do. |
| XII | {Zinc benzoate / Sorbitol} | 4.5 / 4.5 | }do | Yellow | {Mottled yellow black} | Mottled yellow black | }___do___ | ___do___ | ___do___ | ___do___ | Do. |
| XIII | {Calcium salts of tallow fatty acids / Sorbitol} | 4.5 / 4.5 | }Pink | {Reddish brown} | Dark reddish brown | }Black | ___do___ | ___do___ | ___do___ | ___do___ | Do. |
| XIV | {Zinc benzoate / Clacium salts of tallow fatty acids / Sorbitol 1:1:1} | 3.0 / 3.0 / 3.0 | }Cream | Pale yellow | Pale yellow | Pale yellow | Yellow | Yellow | Yellow | Yellow | Yellow. |

¹ Decomposed on the mill.

It is apparent from the above results that the stabilizer system of the invention in the proportions indicated in XIV gave by far the best results. The zinc benzoate, calcium salts of mixed tallow fatty acids and sorbitol alone, VIII, IX and X, respectively, were completely ineffective, In these proportions the stabilizer system does not impart quite as good heat resistance, but it was not used in the same amount of Sample XIV of Table IV. Better stabilization could be obtained by using more of the stabilizer system by weight of the resin.

EXAMPLE 13

A stabilizer system was prepared composed of a mixture of the zinc benzoate 2 parts, calcium salts of mixed tallow fatty acids 3 parts, and sorbitol 3 parts. This stabilizer system was used in accordance with Example 10 in the amount of 8 parts by weight with 150 parts by weight of Geon 103 Ep resin. The composition was then held in an oven at 375° F. to determine its heat stability. The color noted was as reported in Table VI below.

*Table VI*

Initial—Pale Yellow
After 15 minutes of heating—Yellow
After 30 minutes of heating—Yellow
After 45 minutes of heating—Yellow
After 60 minutes of heating—Yellow
After 75 minutes of heating—Yellow
After 90 minutes of heating—Yellow
After 105 minutes of heating—Yellow
After 120 minutes of heating—Black This stabilizer system gave stabilization up to 105 minutes at 375° F. instead of up to 120 minutes, but only 8 parts was used as compared to 9 parts in Sample XIV in Table IV.

EXAMPLE 14

A stabilizer system was prepared composed of zinc benzoate 2.25 parts calcium salts of mixed tallow fatty acids 2.25 parts, and sorbitol 4.5 parts. This stabilizer system was used in accordance with Example 1 in the amount of 9 parts by weight with 150 parts by weight of Geon 103 Ep resin. The composition was then held in an oven at 375° F. to determine its heat stability. The color noted was as reported in Table VII below.

*Table VII*

Initial—Pale Yellow
After 15 minutes of heating—Pale Yellow
After 30 minutes of heating—Pale Yellow
After 45 minutes of heating—Yellow
After 60 minutes of heating—Yellow
After 75 minutes of heating—Yellow
After 90 minutes of heating—Yellow
After 105 minutes of heating—Yellow
After 120 minutes of heating—Yellow In these proportions the stabilizer system imparts quite as good heat resistance as Sample XIV of Table IV.

EXAMPLE 15

The series of formulations of Example 10 were prepared again, substituting calcium salts of the mixed fatty acids derived from coconut oil for the tallow fatty acids used in that example. The same results were obtained. The composition corresponding to Sample XIV imparted adequate heat resistance for 120 minutes of heating at 375° F., whereas the other compositions tested gave stabilization only for about 45 minutes of heating.

EXAMPLE 16

The series of formulations of Example 10 were prepared again, substituting calcium salts of the mixed fatty acids derived from hydrogenated cottonseed oil for the tallow fatty acids used in that example. The same results were obtained. The composition corresponding to Sample XIV imparted adequate heat resistance for 120 minutes of heating at 375° F., whereas the other compositions tested gave stabilization only for about 45 minutes of heating.

EXAMPLE 17

The series of formulations of Example 10 were prepared again, substituting calcium salts of the mixed fatty acids derived from hydrogenated corn oil for the tallow fatty acids used in that example. The same results were obtained. The composition corresponding to Sample XIV imparted adequate heat resistance for 120 minutes of heating at 375° F., whereas the other compositions tested gave stabilization only for about 45 minutes of heating.

EXAMPLE 18

The series of formulations of Example 10 were prepared again, substituting calcium salts of the mixed fatty acids derived from peanut oil for the tallow fatty acids used in that example. The same results were obtained. The composition corresponding to Sample XIV imparted adequate heat resistance for 120 minutes of heating at 375° F., whereas the other compositions tested gave stabilization only for about 45 minutes of heating.

EXAMPLE 19

A composition was prepared exactly as in Example 10 employing as the stabilizer system a mixture of 3 parts zinc benzoate, 3 parts of calcium salts of tallow fatty acids, and 3 parts pentaerythritol. This stabilizer system was used in the amount of 9 parts by weight with 150 parts by weight of Geon 103 Ep resin. The stabilization obtained when the resin composition was held in an oven at 375° F. was equivalent to that of Sample XIV of Table IV. Thus, pentaerythritol is an equivalent of sorbitol, but it would not be employed in the stabilizer systems of the invention at the present time, because pentaerythritol is not accepted as safe to use in food packaging.

We claim:

1. A polyvinyl chloride resin stabilizer composition capable of improving the resistance of the resin to heat deterioration when heated at 375° F. consisting essentially of a mixture of calcium and zinc salts of which at least one is selected from the group consisting of zinc benzoate and calcium benzoate, and at least one of the other salts is selected from the group consisting of the calcium salts of mixed fatty acids derived from edible fats and oils, and the zinc salts of mixed fatty acids derived from edible fats and oils, and sorbitol, in the proportions of from about 15 to about 40 parts of the benzoate, from about 15 to about 50 parts of the fatty acid salts, and from 20 to about 60 parts of sorbitol.

2. A polyvinyl chloride resin stabilizer composition in accordance with claim 1 in which the benzoate, fatty acid salts and sorbitol are in the proportion of 1:1:1.

3. A polyvinyl chloride resin stabilizer composition in accordance with claim 1 in which the fatty acids are tallow fatty acids.

4. A polyvinyl chloride resin stabilizer composition in accordance with claim 1 in which the fatty acids are coconut oil fatty acids.

5. A polyvinyl chloride resin stabilizer composition in accordance with claim 1 in which the fatty acids are hydrogenated cottonseed oil fatty acids.

6. A polyvinyl chloride resin stabilizer composition in accordance with claim 1 in which the fatty acids are hydrogenated corn oil fatty acids.

7. A polyvinyl chloride resin stabilizer composition in accordance with claim 1 in which the fatty acids are peanut oil fatty acids.

8. A polyvinyl chloride resin composition having improved resistance to heat deterioration consisting essentiall of a polyvinyl chloride resin, and a stabilizer composition consisting essentially of a mixture of calcium and zinc salts of which at least one is selected from the group consisting of zinc benzoate and calcium benzoate, and at least one of the other salts is selected from the group consisting of the calcium salts of mixed fatty acids derived from edible fats and oils, and the zinc salts of mixed fatty acids derived from edible fats and oils, and sorbitol, in the proportions of from about 15 to about 40 parts of the benzoate, from about 15 to about 50 parts of the fatty acid salts, and from about 20 to about 60 parts of sorbitol, the said stabilizer composition being present in an amount to improve the resistance to heat deterioration when the composition is heated at 375° F.

9. A polyvinyl chloride resin composition in accordance with claim 8 in which the polyvinyl chloride resin is a polyvinyl chloride homopolymer.

10. A polyvinyl chloride resin composition in accordance with claim 8 in which the polyvinyl chloride resin is a copolymer of vinyl chloride and vinyl acetate.

11. A polyvinyl chloride resin composition in accordance with claim 8 in which the benzoate, fatty acid salts and sorbitol are in the proportion of 1:1:1.

12. A polyvinyl chloride resin composition in accordance with claim 8 in which the fatty acids are tallow fatty acids.

13. A polyvinyl chloride resin composition in accordance with claim 8 in which the fatty acids are coconut oil fatty acids.

14. A polyvinyl chloride resin composition in accordance with claim 8 in which the fatty acids are hydrogenated cottonseed oil fatty acids.

15. A polyvinyl chloride resin composition in accordance with claim 8 in which the fatty acids are hydrogenated corn oil fatty acids.

16. A polyvinyl chloride resin composition in accordance with claim 8 in which the fatty acids are peanut oil fatty acids.

17. A polyvinyl chloride resin stabilizer composition capable of improving the resistance of the resin to heat deterioration when heated at 375° F. consisting essentially of calcium benzoate, the zince salts of mixed fatty acids derived from edible fats and oils, and sorbitol, in the proportions of from about 15 to about 40 parts of the calcium benzoate, from about 15 to about 50 parts of the zinc salts, and from about 20 to about 60 parts of sorbitol.

18. A polyvinyl chloride resin stabilizer composition capable of improving the resistance of the resin to heat deterioration when heated at 375° F. consisting essentially of zinc benzoate, the calcium salts of mixed fatty acids derived from edible fats and oils, and sorbitol, in the proportions of from about 15 to about 40 parts of the zinc benzoate, from about 15 to about 50 parts of the calcium salts, and from about 20 to about 60 parts of sorbitol.

19. A polyvinyl chloride resin composition having improved resistance to heat deterioration consisting essentially of a polyvinyl chloride resin, and a stabilizer composition consisting essentially of calcium benzoate, the zinc salts of mixed fatty acids derived from edible fats and oils, and sorbitol, in the proportions of from about 15 to about 40 parts of the calcium benzoate, from about 15 to about 50 parts of the zinc salts, and from about 20 to about 60 parts of sorbitol, the said stabilizer composition being present in an amount to improve the resistance to heat deterioration when the composition is heated at 375° F.

20. A polyvinyl chloride resin composition having improved resistance to heat deterioration consisting essentially of a polyvinyl chloride resin, and a stabilizer composition consisting essentially of zinc benzoate, the calcium salts of mixed fatty acids derived from edible fats and oils, and sorbitol, in the proportions of from about 15 to about 40 parts of zinc benzoate, from about 15 to about 50 parts of the calcium salts, and from about 20 to about 60 parts of sorbitol, the said stabilizer composion being present in an amount to improve the resistance to heat deterioration when the composition is heated at 375° F.

References Cited in the file of this patent

UNITED STATES PATENTS

| | | |
|---|---|---|
| 2,711,401 | Lally | June 21, 1955 |
| 2,918,451 | Elliott | Dec. 22, 1959 |
| 2,935,491 | Mack | May 4, 1960 |

UNITED STATES PATENT OFFICE
CERTIFICATE OF CORRECTION

Patent No. 3,004,000                                 October 10, 1961

Otto S. Kauder et al.

It is hereby certified that error appears in the above numbered patent requiring correction and that the said Letters Patent should read as corrected below.

Columns 3 and 4, Table I, column 6, line 2 thereof, for "do" read -- Dark brown --; columns 5 and 6, Table IV, column 2, line 15 thereof, for "Clacium" read -- Calcium --; column 9, line 30, for "zince" read -- zinc --; column 10, line 37, for "May 4, 1960" read -- May 3, 1960 --.

Signed and sealed this 20th day of March 1962.

(SEAL)
Attest:

ERNEST W. SWIDER
Attesting Officer

DAVID L. LADD
Commissioner of Patents